United States Patent [19]
Rennie

[11] 3,873,580
[45] Mar. 25, 1975

[54] OXIDATION PROCESS
[75] Inventor: Robert Allan Campbell Rennie, Runcorn, England
[73] Assignee: Imperial Chemical Industries Limited, London, Great Britain
[22] Filed: Jan. 8, 1973
[21] Appl. No.: 321,981

[30] Foreign Application Priority Data
Jan. 19, 1972 United Kingdom ............... 2639/72

[52] U.S. Cl. ................ 260/362, 260/370, 260/385, 260/396 R, 260/396 N, 260/599, 260/687, 204/78
[51] Int. Cl. ............................................ C09b 1/00
[58] Field of Search ........ 260/385, 396 R, 370, 590, 260/599, 362; 204/78

[56] References Cited
UNITED STATES PATENTS
3,745,180  7/1973  Rennie .............................. 260/396
3,806,469  4/1974  Morita et al. ...................... 260/396

Primary Examiner—Lorraine A. Weinberger
Assistant Examiner—E. Jane Skelly
Attorney, Agent, or Firm—Cushman, Darby and Cushman

[57] ABSTRACT

Process for the liquid phase oxidation of organic compounds, particularly the oxidation of an aromatic nucleus to the corresponding quinone, using an aqueous solution of a persulphate compound as oxidising agent in the presence, as catalyst, of cerium, chromium or vanadium, and preferably in the presence, as co-catalyst, of silver or iron. The catalyst and co-catalyst are preferably water-soluble salts.

Preferably, the organic compound is substantially water-insoluble, and is in solution in a non-reactive, substantially water-immiscible solvent.

14 Claims, 1 Drawing Figure

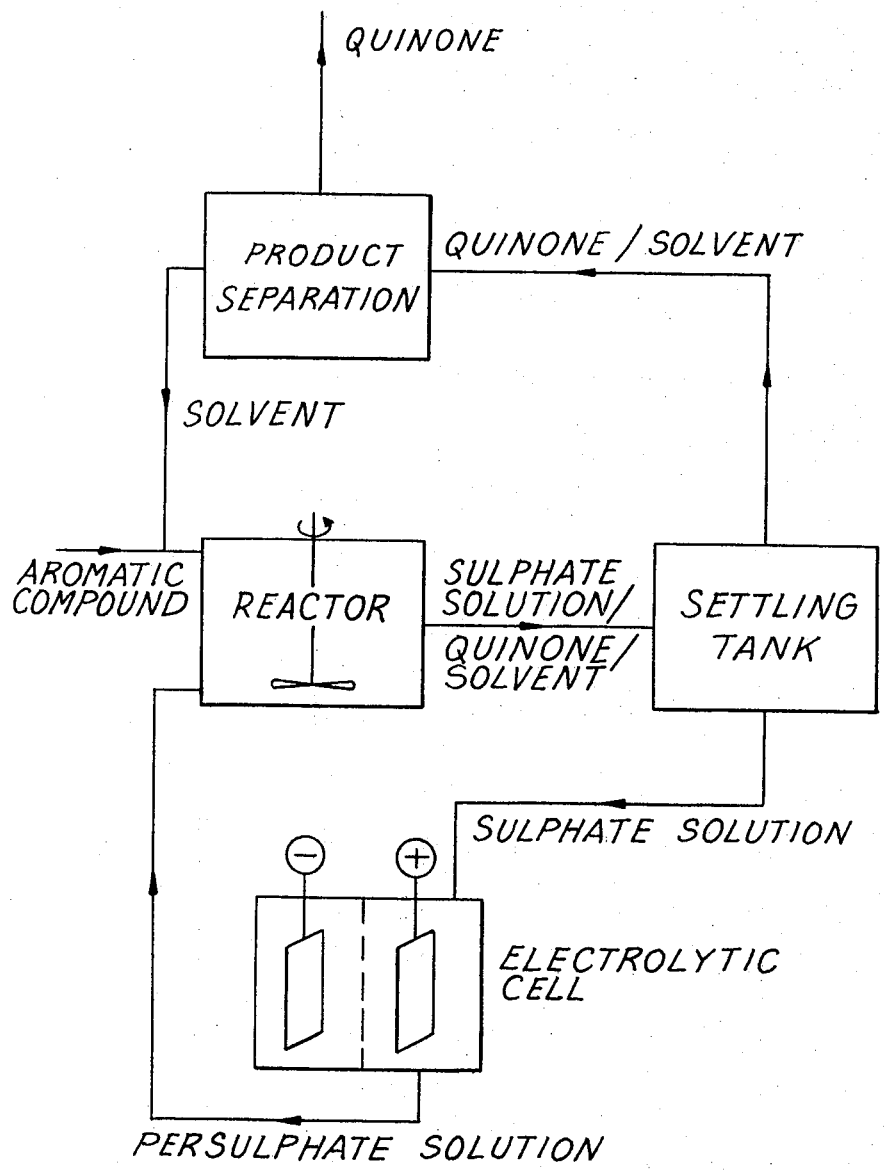

OXIDATION PROCESS

This invention relates to the oxidation of organic compounds, and especially, but not exclusively, to the oxidation of aromatic compounds to the corresponding quinones.

It is known to use aqueous solutions of variable valence elements as reagents for the oxidation or reduction of organic compounds. The spent redox reagent may then be regenerated electrolytically. For example, our British Pat. No. 1,203,434, and equivalents elsewhere, describes and claims a process for reducing or oxidising a substantially water-immiscrible organic substrate by contacting a reagent comprising an aqueous solution of a compound of a variable valency element, in which the variable valency element is in an appropriate oxidation state, with a solution of the organic substrate in a non-reactive, water-immiscible solvent, separating the two phases after reaction, and regenerating the reagent by electrolysis.

The above process is particularly applicable to the oxidation of aromatic compounds to quinones, using an aqueous solution of a ceric compound as the oxidising agent, as described and claimed in our Brit. Pat. No. 1,192,037, and equivalents elsewhere.

According to the present invention, we provide a process for the liquid phase oxidation of organic compounds using an aqueous solution of a persulphate compound (peroxodisulphate compound) as oxidising agent, in the presence, as catalyst, of at least one of cerium, chromium or vanadium. Cerium is preferred.

It does not appear to be necessary for the catalyst to be of high purity and it is possible, for example, to use commercial grades of cerium which contain mixtures of other elements, particularly other lanthanides.

It is possible for the catalyst to be in the form of a water-insoluble solid, for example a finely divided metal or a metal compound deposited on a solid, inert support. It is preferred, however, for the catalyst to be supplied as a water-soluble metal salt. The catalyst metal will then normally be present in ionic form. The initial valence state of the catalyst does not appear to be critical, but it is preferred for the metal to be employed as a high valence ion. Thus the catalyst is preferably supplied as a Ce(IV) salt.

The organic compound used as starting material may be employed as an aqueous suspension or emulsion. It is preferred, however, if the organic compound is not itself liquid, for the organic compound to be in liquid solution, preferably in a non-reactive, substantially water-immiscible solvent.

The process may be operated in a single liquid phase, for example the oxidation of a water-miscible organic compound using an aqueous solution of a persulphate compound as the oxidising agent. However, the process is particularly suitable for two-phase operation, the phases being (i) a liquid organic phase consisting of or including the organic compound to be oxidised (the substrate) and (ii) an aqueous solution of a persulphate compound. Preferably, the substrate is substantially water-immiscible and is employed in solution in a non-reactive, water, immiscible solvent, as described and claimed in British Pat. No. 1,203,434.

Suitable water-immiscible solvents include those described in British Pat. No. 1,203,434, for example aliphatic hydrocarbons, particularly those containing 5 to 15 carbon atoms, for example petroleum solvents and hexane. Ethers and halogenated solvents are also suitable.

The process is particularly useful for the oxidation of an aromatic nucleus to the corresponding quinone. Particularly suitable aromatic compounds are the fused ring polynuclear aromatic hydrocarbons, and substituted derivatives thereof, for example, naphthalene, anthracene, phenanthrene or pyrene, and substituted derivatives thereof, which are oxidised to naphthoquinones, anthraquinones, phenanthraquinones and pyrene-quinones, respectively. Other useful aromatic compounds include diphenyl compounds and the phenols, and substituted derivatives thereof. Thus, for example diphenyl may be oxidised to 2-phenylbenzoquinone and 2,6-di-t-butylphenol may be oxidised to 2,2',6,6'-tetra-t-butyldiphenoquinone.

The persulphate compound is preferably used in approximately stoichiometric quantities, but greater or lesser proportions may be employed as required.

A particularly convenient persulphate compound, because of its ready availability and good water solubility, is ammonium persulphate ($(NH_4)_2S_2O_8$), but other persulphate compounds, for example sodium and potassium persulphates or the free acid, peroxodisulphuric acid, may be employed. Since the active species is believed to be the persulphate anion, the associated cation will be chosen solely on the grounds of availability and convenience of operation. Mixtures of persulphate compounds may be employed.

The cerium or other metal appears to exert a catalytic effect on the oxidising action of the persulphate anion. The quantity of cerium, or other transition metal does not appear to be critical, but, for economic reasons, should be as low as possible. A convenient quantity is about 0.01 to 1 mole of catalyst/mole of substrate, but greater or lesser amounts can be used as required.

Preferably, the oxidation is performed in the presence, as co-catalyst, of at least one of silver or iron, with silver being preferred.

At least one of the catalyst and the co-catalyst may be employed as a water-insoluble solid, for example, finely divided metal or a metal compound on a solid, inert support, for example charcoal or alumina, but it is preferred for both the catalyst and the co-catalyst to be supplied as water-soluble metal salts. When a co-catalyst is employed, the concentration is conveniently in the range 0.01 to 1 mole/mole of catalyst, but greater or lesser amounts can be used as required.

The reaction temperature is not critical, and may be between the freezing and boiling points of the reaction mixture. For a two-phase system, it is to be understood that freezing and boiling point refer to either one of the liquid phases, the essential feature being that all the reagents remain in liquid solution.

High temperatures may cause excessive loss of material by evaporation (including sublimation) or may cause decomposition of the components of the reaction mixture, and it is therefore preferred to operate at temperatures from ambient upto about 80°C.

Particularly if the metals present can form insoluble hydroxides, it may be necessary to operate in acid conditions. The reaction mixture can readily be rendered acid by inclusion of a mineral acid, for example sulphuric acid. Conveniently, the pH of the reaction mixture, or of the aqueous phase, may be in the range 2 to 7, but operation outside this range is within the scope of our invention.

The use of a strongly acid medium also favours electrolytic regeneration of the persulphate.

Particularly when a two-phase reaction system is employed, it is desirable that the reaction mixture is stirred or otherwise agitated, for example by ultrasonic mixing, in order to ensure adequate mixing of the reagents.

The oxidation may be performed batchwise or continuously and with or without regeneration of the persulphate. Preferably, the oxidation is performed continuously, and the sulphate produced is oxidised back to the persulphate.

The spent persulphate may be regenerated electrolytically, by anodic oxidation of the sulphate product. The electrolysis may be performed in the reaction vessel simultaneously with oxidation of the substrate but, preferably, the sulphate solution is withdrawn from the reaction vessel, continuously or intermittently, and passed to a separate electrolytic cell for regeneration of the persulphate anion. Preferably, spent persulphate is regenerated simultaneously with the oxidation reaction.

The oxidised product, for example a quinone, is withdrawn from the reaction vessel, continuously or intermittently, and separated from associated solvent in conventional manner, for example, by distillation.

A convenient two phase continuous process for the production of quinones, including regeneration of the reagent, will now be described with reference to the attached drawing, which is a simplified flow diagram of a process according to our invention.

An aromatic compound, in solution in a suitable water-immiscible solvent, is fed to an agitated reactor vessel, together with an aqueous persulphate solution which includes a cerium (or other metal) salt, and, preferably a co-catalyst, for example a silver salt. After an appropriate reaction period, the mixture, which may be in the form of a fine dispersion or emulsion, passes to a settling tank where the aqueous and organic layers separate. The organic layer, containing the quinone, is passed to product separation, which may be a distillation apparatus. Recovered solvent is used to take up more aromatic compound starting material, and is returned to the reactor. The aqueous layer from the settling tank contains a sulphate compound, and is passed to an electrolytic cell to regenerate the persulphate compound, for returning to the reactor.

Several reactor/settling tank stages may be combined and arranged to give a multistage countercurrent process.

The electrolytic cell may be undivided or it may have a porous partition or ion exchange membrane between the electrodes. The anodes of the cell are constructed of an inert conducting material, for example platinum, platinised titanium or carbon. A lead oxide ($PbO_2$) coating may be applied to the anode. The cathodes may be, for example, lead, carbon, platinum, platinised titanium, or other inert conducting material. The sulphate solution may be supplied to the cell batchwise or continuously.

The process is illustrated by the following Examples, in which yields are mole %, calculated on the basis of the initial substrate, except where indicated.

Preparation of Ammonium Persulphate

An electrolytic cell, lined with poly(vinyl chloride), was fitted with a platinum anode and a lead cathode. (Carbon cathodes are equally effective). Optionally, the cathode was wrapped around with asbestos.

There was supplied to the cell an aqueous electrolyte solution consisting of ammonium sulphate (250 g.$l^{-1}$) and sulphuric acid (250 g.$l^{-1}$).

This solution was held at 30°C with stirring and was electrolysed under the following conditions:

| | |
|---|---|
| Cell voltage | 5.5–6.5 V |
| Current density | 150 A. $dm^{-2}$ |
| Current concentration | 13 A. $l^{-1}$ |

At equilibrium the product stream withdrawn from the cell analysed as follows:

| | |
|---|---|
| Ammonium persulphate | 250 g.$l^{-1}$ |
| Ammonium sulphate | 100 g.$l^{-1}$ |
| Sulphuric acid | 200 g.$l^{-1}$ |

The current efficiency was 70-80% and the energy consumption was 1.8–2.2 KW hr/kg of ammonium persulphate.

EXAMPLE 1

Naphthalene to 1,4-naphthoquinone

A reaction vessel was fitted with a heating mantle and a "Vibromixer" stirrer ("Vibromixer" is a Registered Trade Mark).

A solution of naphthalene in hexane (0.1 M) was added to the reaction vessel, together with an aqueous solution of ammonium persulphate (0.78 M). The relative volumes of the organic and aqueous phases were 1000:385, giving a molar ratio of naphthalene/ammonium persulphate of 1:3. This mixture was maintained at 40°C.

Ceric sulphate (0.14 M) and silver nitrate (0.06 M) were dissolved in 2% (by weight) sulphuric acid, and sufficient of this solution was added to the reaction vessel to give 0.7 moles of $Ce^{4+}$ and 0.3 moles of $Ag^+$ per mole of naphthalene. The stirrer was started and reaction allowed to continue.

After 2 hours reaction, the organic and aqueous phases were separated. The aqueous phase was extracted with chloroform, and the chloroform extracts added to the hexane solution. This solution was dried and the solvents removed by evaporation to give a yellow solid. This was recrystallised from hexane to give 1,4-naphthoquinone in a yield of 86% of the theoretical yield.

The product was identified by its melting point and by thin-layer chromatography and infra-red spectroscopy.

Quantitative analysis was by gas-liquid chromatography, using a 1 m column packed with neopentylglycolsebacate on "Embacel," with diphenyl as internal standard.

EXAMPLE 2

Naphthalene to 1,4-naphthoquinone

A solution of naphthalene in hexane (0.1 M) was added to the reaction vessel of Example 1, together with a 0.78 M solution of ammonium persulphate in sulphuric acid (200 g.$l^{-1}$). The relative volumes of the organic and aqueous phases were 1000:385, giving a molar ratio of naphthalene/ammonium persulphate of 1:3. This mixture was maintained at 40°C.

To the reaction vessel was added an aqueous solution of ceric ammonium nitrate (0.2 M) and silver nitrate (0.1 M) in sufficient quantity to give 0.1 moles of $Ce^{4+}$ and 0.05 moles of $Ag^+$ per mole of naphthalene. The stirrer was started and reaction allowed to continue.

After 2 hours reaction, product separation and analysis as in Example 1 gave 1,4-naphthoquinone, in a yield of 75% calculated on the basis of consumed persulphate and a yield of 90% calculated on the basis of consumed naphthalene.

EXAMPLE 3

Diphenyl to 2-phenylbenzoquinone 10 parts by volume of a solution of diphenyl in hexane (0.1 M) was mixed with 9 parts by volume of an aqueous solution of ammonium persulphate (0.68 M). To this mixture was added 0.5 parts by volume of an aqueous solution of silver nitrate (0.1 M) and ceric ammonium nitrate (0.2 M), giving 0.1 moles of cerium and 0.05 moles of silver per mole of diphenyl.

The mixture was stirred at 40°C for 3 hours, and was then cooled. The hexane layer was separated. The aqueous layer was extracted with methylene chloride and the methylene chloride extracts were added to the hexane solution. This solution was dried over sodium sulphate, and the solvents were removed by evaporation. The yellow solid residue produced was recrystallised from ethyl acetate/hexane to give 2-phenylbenzoquinone in 72.5% yield.

The product was identified by thin-layer chromatography comparison with an authentic sample.

EXAMPLE 4

Anthracene to 9,10-anthraquinone

The procedure of Example 3 was repeated with the diphenyl replaced by the same molar concentration of anthracene.

After 2 hours reaction, a yellow solid was produced, which was recovered from the reaction mixture by filtration. The filtrate was extracted with methylene chloride, and the yellow solid residue was recrystallised from the methylene chloride extracts to give 9,10-anthraquinone in 85% yield.

The product was identified by its melting point, mixed melting point and thin-layer chromatography.

EXAMPLE 5

Pyrene to pyrene quinones

The procedure of Example 4 was repeated, with the anthracene replaced by the same molar concentration of pyrene. Oxidation was performed at 20°C for 45 min.

The crude red-yellow product was recrystallised from ethyl acetate/hexane to give a mixture of 3,8-and 3,10-pyrenequinones, in 70% yield.

The products were identified by mass spectrometry and by comparison of the infra-red spectra with authentic samples.

EXAMPLE 6

Chrysene to 1,2-chrysoquinone

The procedure of Example 5 was repeated, with the pyrene replaced by the same molar concentration of chrysene.

After 1.5 hours reaction, the yield of 1,2-chrysoquinone, recrystallised from ethyl acetate/hexane, was 50%.

EXAMPLE 7

1-Nitronaphthalene to 5-nitro-1,4-naphthoquinone 10 parts by volume of a solution of 1-nitronaphthalene in hexane (0.1 M) was oxidised at 40°C with 4 parts by volume of aqueous ammonium persulphate solution (0.75 M) and 5 parts by volume of aqueous ceric sulphate (0.14 M) and silver nitrate (0.06 M). The reaction mixture contained 0.7 moles of cerium and 0.3 moles of silver per mole of 1-nitronaphthalene.

After 2 hours reaction at 40°C the mixture was cooled and the aqueous and organic layers were separated. The aqueous layer was extracted with methylene chloride. The methylene chloride extracts were added to the organic layer, which was evaporated to dryness. The resultant yellow residue was extracted twice with hot hexane, and the remaining solid was recrystallised from ethyl acetate/hexane to give 5-nitro-1,4-naphthoquinone (melting point 165°C) in 29.6% yield.

The product was identified by mass spectrometry and by thin-layer chromatography comparison with an authentic sample.

EXAMPLE 8

Anthracene-2-sulphonic acid to 9,10-anthraquinone-2-sulphonic acid

The potassium salt of anthracene-2-sulphonic acid, in finely powdered form, was added to 30 parts by volume of an aqueous solution of ammonium persulphate (0.7 M) in sufficient quantity to give a molar ratio of anthracene sulphonic acid/persulphate of 3.3:20. The mixture also contained 5 parts by volume of an aqueous solution of ceric ammonium nitrate ($6.6 \times 10^{-2}$ M) and silver nitrate ($3.4 \times 10^{-2}$ M). The mixture thus contained 0.1 mole of cerium and 0.052 mole of silver per mole of anthracene sulphonic acid.

The mixture was heated to 40°C and agitated with a "Vibromixer" stirrer (Registered Trade Mark) for 2 hours. The resultant yellow-brown solution was cooled and concentrated to half its volume. 9,10-anthraquinone-2-sulphonic acid was isolated by salting out with potassium chloride.

The product was identified by thin-layer chromatography comparison with an authentic sample.

EXAMPLE 9

Toluene to benzaldehyde 50 parts by volume of toluene in hexane (0.2 M) was mixed with 63 parts by volume of an aqueous solution of ammonium persulphate (0.64 M) and 5 parts by volume of an aqueous solution of ceric ammonium nitrate (0.2 M) and silver nitrate (0.1 M). The solution contained 0.1 mole of cerium and 0.05 mole of silver per mole of toluene.

The mixture was stirred at 40°C for 1 hour. The aqueous and organic layers were then separated, and the aqueous layer was extracted with methylene chloride. The methylene chloride extracts were added to the organic layer. The organic solution was washed with sodium carbonate, dried, and concentrated by evaporation. The concentrated solution was analyzed by gas-liquid chromatography on a 1 m Apiezon L column at 80°C ("Apiezon" is a Registered Trade Mark for a hydrocarbon grease). Benzaldehyde was produced in 70% yield.

Equivalent results are obtained if the silver nitrate in the above Examples is replaced by a soluble $Fe^{3+}$ salt, but longer reaction times may be required.

EXAMPLE 10

Naphthalene to 1,4-naphthoquinone 10 parts by volume of a solution of naphthalene in hexane (0.1 M) was mixed with 7 parts by volume of an aqueous ammonium persulphate solution (0.6 M). To this mixture was added 0.3 parts by volume of an aqueous solution of vanadyl sulphate (0.33 M) and silver nitrate (0.017 M). The mixture contained 0.1 mole of vanadium and 0.05 mole of silver per mole of naphthalene.

The reaction mixture was agitated at 40°C for 2 hours and the aqueous and organic layers were separated. The aqueous layer was extracted with methylene chloride and the methylene chloride extracts added to the organic layer. The organic solution was dried and concentrated by evaporation. The solution was analyzed by gas-liquid chromatography, and contained unchanged naphthalene (44%) and 1,4-naphthoquinone (55%).

EXAMPLE 11

Naphthalene to 1,4-naphthoquinone

The procedure of Example 10 was repeated with the vanadyl sulphate replaced by the same molar concentration of sodium dichromate.

After 2 hours reaction, the resultant organic solution contained unchanged naphthalene (55%) and 1,4-naphthoquinone (45%).

EXAMPLE 12

Naphthalene to 1,4-naphthoquinone

Naphthalene was oxidised with simultaneous regeneration of the persulphate oxidant, using the general arrangement of the accompanying drawing.

The elctrolytic cell was of the filter press type, with the electrode compartments separated by an asbestos diaphragm. Total current supplied was measured by an electronic coulometer, and the polarity of the electrodes, which were platinum mesh, could be reversed. The cell was operated at 5.0 to 5.5 V and a current density of 50 A $dm^2$. Cell temperature was 25°–28°C.

The reactor was a flanged vessel, 1,000 parts by volume, fitted with a condensor, a thermometer, and a sealed "Vibromixer" stirrer. A dip pipe fitted to the reactor transferred aqueous phase, together with some of the organic phase, to a phase separating column which was four times as long as its diameter. Liquid was pumped to the head of the phase separating column by a peristaltic pump. The bottom layer of the phase separating column (the aqueous phase) passed by gravity to a two-way tap discharging to either side of the filter-press electrolytic cell. A two-way tap, also connected to either side of the electrolytic cell, permitted the cell contents to flow, also by gravity, back to the reactor.

The reactor was initially charged with 600 parts by volume of a solution of naphthalene in hexane (0.17 M). The electrolytic cell and the connecting lines were filled with an aqueous solution of ammonium sulphate (200 g $l^{-1}$) in sulphuric acid (250 g $l^{-1}$). 400 parts by volume of this solution were placed in the reactor, and the phase separating column was filled to three-eighths of its height.

The electrolytic cell, the "Vibromixer" and the peristaltic pump were actuated. The aqueous solution flowed from the reactor to the phase separating column, through the anode compartment of the electrolytic cell and back to the reactor.

After 30 min. reaction, titration of a sample showed that the aqueous phase in the reactor included the persulphate ion. The reactor was then heated to 40°C, and 20 parts by volume of an aqueous solution of ceric ammonium nitrate (0.25 M) and silver nitrate (0.15 M) was added to the system, giving 0.05 moles of cerium and 0.03 moles of silver per mole of naphthalene. Reaction was continued for 4 hours. In order to prevent deposition of silver in the electrolytic cell, the polarity of the electrodes was reversed every 0.5 hour. The two-way taps were so adjusted that the aqueous phase always flowed through the anode compartment of the cell.

The product 1,4-naphthoquinone was isolated and purified as described in Example 1. The yield of naphthoquinone was 70%, and the current efficiency, calculated on the basis of naphthalene converted, was 70%.

The above procedure may be operated with continuous or intermittent supply of fresh naphthalene to the reactor.

What we claim is:

1. A process for the liquid phase oxidation of an aromatic organic compound to the corresponding quinone which comprises contacting the said organic compound with an aqueous solution of a persulphate compound in the presence of a catalytic quantity of cerium, chromium or vanadium or a mixture thereof.

2. The process of claim 1 when performed in the presence of a co-catalyst containing silver or iron.

3. The process of claim 2 in which the catalyst and co-catalyst, respectively, are water-soluble metal salts.

4. The process of claim 3 in which the catalyst is a cerium salt and the co-catalyst is a silver salt.

5. The process of claim 3 in which the concentration of catalyst is in the range 0.01 through 1.0 mole/mole of organic compound.

6. The process of claim 5 in which the concentration of co-catalyst is in the range 0.01 through 1 mole/mole of catalyst.

7. The process of claim 2 in which at least one of the catalyst and co-catalyst is a water-insoluble solid.

8. The process of claim 7 in which the water-insoluble solid is a metal compound on a solid, inert support.

9. The process of claim 2 in which the organic compound is in solution in a non-reactive, substantially water-immiscible solvent.

10. The process of claim 2 in which the pH of the aqueous solution of persulphate compound is in the range 2 to 7.

11. The process of claim 2 when performed at a temperature from ambient upto 80°C.

12. The process of claim 2 in which the aromatic compound is a fused ring polynuclear aromatic hydrocarbon, a diphenyl compound, a phenol or a substituted derivative of the above compounds.

13. The process of claim 4 in which the organic compound is naphthalene, diphenyl, anthracene, pyrene, chrysene, 1-nitronaphthalene, or anthracene-2-sulphonic acid.

14. The process of claim 2 in which spent persulphate is regenerated by electrolytic oxidation in a vessel separate from that employed for the oxidation reaction.

* * * * *